C. WERNER.
CAN TESTER.
APPLICATION FILED OCT. 4, 1909.
983,962.
Patented Feb. 14, 1911.
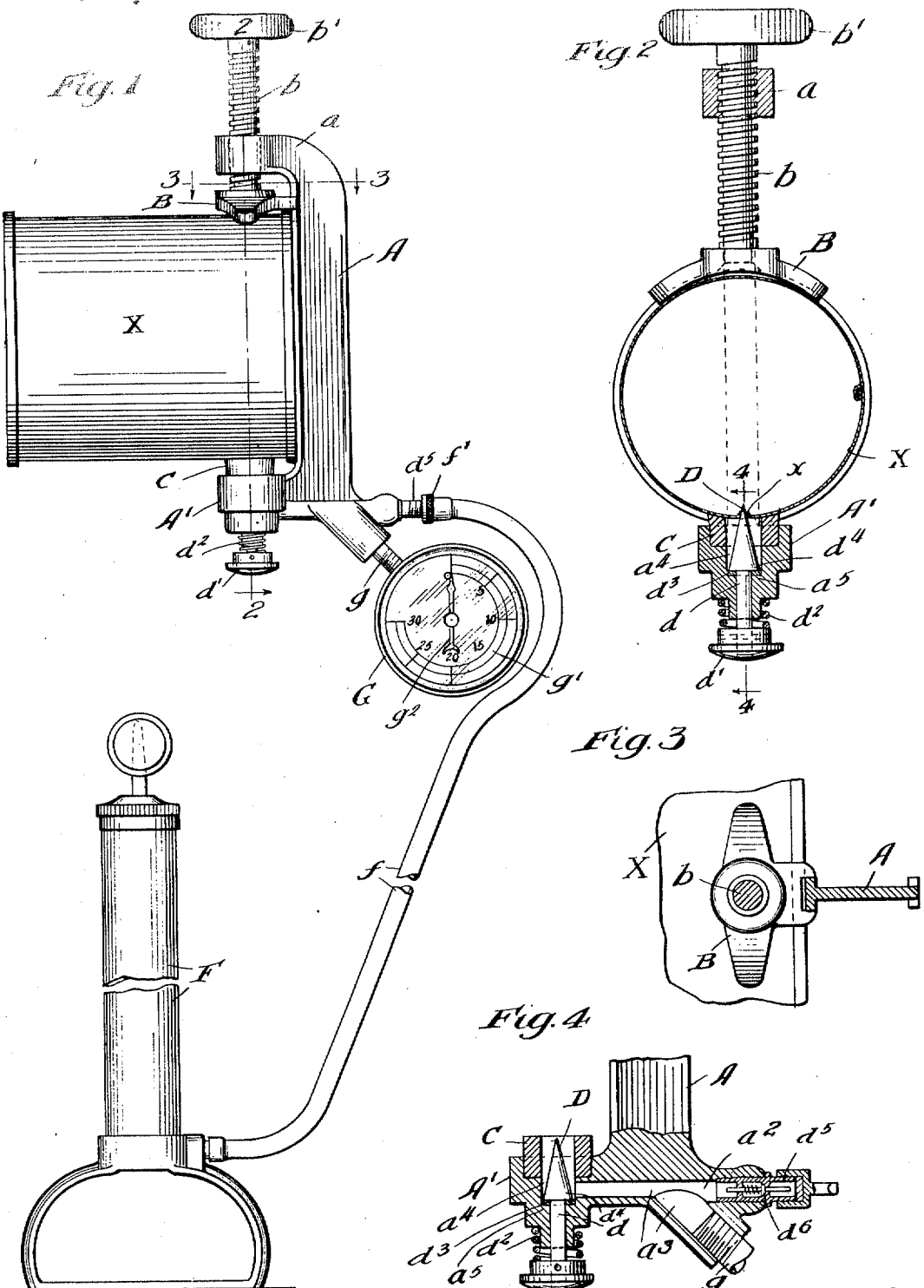

UNITED STATES PATENT OFFICE.

CHARLES WERNER, OF SAN FRANCISCO, CALIFORNIA, ASSIGNOR TO AMERICAN CAN COMPANY, OF NEW YORK, N. Y., A CORPORATION OF NEW JERSEY.

CAN-TESTER.

983,962.  Specification of Letters Patent.  Patented Feb. 14, 1911.

Application filed October 4, 1909. Serial No. 520,935.

*To all whom it may concern:*

Be it known that I, CHARLES WERNER, a citizen of the United States, residing in San Francisco, in the county of San Francisco and State of California, have invented a new and useful Improvement in Can-Testers, of which the following is a specification.

My invention relates to can testers or devices for testing the hermetic tightness of cans and the strength of their seams.

In canning factories, spoiled cans, ordinarily called "swell heads," may be either due to a leaky can, or imperfection of its seams, or to improper or imperfect sterilization of the contents of the can, and it is a matter of great importance, as well as convenience, to have some means or device for easily and quickly testing or determining whether the "swell head" is due to a defective can or defective sterilization or other cause. And in the practical manufacture and sealing or closing of cans, especially cans of the kind commonly known as sanitary cans, in which the heads or covers are secured to the body without solder by means of double seams, it is of great importance to have some quick, easy and convenient means for testing from time to time whether the seams being produced by the double seamer in making the cans, and also in closing the cans after they have been filled, are hermetically tight and perfect, and also of testing the strength of the seams of cans in order to determine whether the same can be safely relied upon to stand the internal or bursting pressure to which the cans are necessarily subjected in the cooking or processing operations of the cannery.

The object of my invention is to provide a can tester of a strong, simple, efficient, and durable construction for accomplishing this object or result, and this without injuring or destroying the particular can tested.

Heretofore in can testers of the kind to which my invention relates and designed for accomplishing a similar object, the same have operated to so cut and puncture the head or other wall of the can to which the tester is applied, as to render it practically impossible to solder up the opening made in the testing operation, and the cans selected for testing purposes have consequently ordinarily been destroyed, although, if the can has been filled prior to the test, its contents may of course be saved by emptying it into another can.

My invention consists in the means I have devised and employ for practically accomplishing the above mentioned object or result.

In the accompanying drawing forming a part of this specification, Figure 1 is a side elevation of a can tester embodying my invention. Fig. 2 is a cross section on line 2—2 of Fig. 1 somewhat enlarged, and the can being shown of smaller diameter than in Fig. 1. Fig. 3 is a detail section on line 3—3 of Fig. 1 and Fig. 4 is a detail vertical section on line 4—4 of Fig. 2.

In the drawing, A represents a clamp yoke or frame adapted to receive a can between its two arms. One of the arms $a$ of the clamp yoke A is provided with a movable can clamp B, having an operating screw $b$ furnished with a handle or wheel $b^1$ for turning the same to clamp and unclamp the can. The other arm $A^1$ of the clamp yoke is hollow and provided with a sealing head C, preferably a rubber sleeve or ring, and with a movable can puncturing device D mounted within the sealing head C and having a stem $d$ extending out through the hollow arm $A^1$ of the clamp yoke, and provided with a knob or handle $d^1$ for operating the puncturing device, and with a coiled spring $d^2$ for withdrawing the puncturing device within the sealing head after the test puncture has been made in the wall of the can. The hollow arm $A^1$ of the clamp yoke is preferably integral with the yoke A, and is furnished with a passage $a^2$ communicating with an air pump F or other compressed air supply, and with a passage $a^3$ communicating with the pressure gage G, and with a further passage or chamber $a^4$ communicating with the interior of the can to be tested, and in which the puncture device D is mounted. The puncture device D is preferably furnished with a gasket or sealing ring of elastic material, $d^3$, which is compressed between the head or shoulder $d^4$ of the puncture device D and the surrounding seat $a^5$ of the hollow arm or coupling $A^1$ to prevent escape of compressed air around the stem of the puncture device.

The hollow arm or coupling $A^1$ of the clamp yoke is preferably connected to the air pump F by means of a flexible pipe $f$ and a screw threaded coupling $f^1$, engaging a screw threaded coupling $d^5$ which is furnished with a check valve $d^6$.

The pressure gage G is removably connected to the hollow arm or coupling $A^1$ of the clamp yoke by its screw stem $g$. The pressure gage may be of any suitable kind or construction. It is preferably furnished with a dial $g^1$ and indicating hand $g^2$.

The can clamp B is preferably a curved segment, proximately conforming to the circle of the can to be tested, and is preferably adapted to engage the body of the can near one of its heads or ends.

The puncture device D is preferably of a sharp pointed acutely conical form, and adapted to make a small hole in the wall of the can just large enough to admit compressed air from the pump F with sufficient rapidity to enable the testing to be done quickly, and making an opening at the same time of a character which can be readily soldered up as any ordinary vent in a can; so that after the can has been tested, the puncture hole may be readily soldered up and the can and its contents saved for use.

In operation, the can is clamped between the sealing head or ring C and clamp B of the clamp yoke A, as illustrated in Fig. 1, or if preferred, by having the clamp and sealing head engage the top and bottom heads of the can. The puncture device D is then operated through its handle and stem to make a small vent or hole in the wall of the can in the portion thereof surrounded by the sealing head B; and then compressed air is admitted into the can from the pump or other source of compressed air until the gage G indicates the desired internal pressure in the can. If the can is perfect and hermetically tight, the finger of the pressure gage will then remain stationary. If, however, the can is a leaky or defective one, air will escape therefrom through the leak and will be indicated by the reduction of pressure shown by the finger of the pressure gage. The position of the leak may also be readily located from the escaping air. In using my tester for testing the strength of double or folded seams or soldered seams of cans, the internal pressure in the can may be gradually increased by operation of the pump until any desired pressure is reached, or until the can is bursted or some of its seams destroyed. After the can has been tested, the can clamp B is withdrawn by its operating screw and the can removed; and the opening $x$ in the wall of the can X, made by the puncture device D, may then be soldered up like an ordinary vent in a can, and the can as well as its contents saved for further use.

I claim:—

1. In a can tester, the combination with a clamp yoke having an arm furnished with a movable can clamp, and a hollow arm provided with a sealing head, a movable puncture device mounted on said hollow arm within said sealing head, and a pressure gage and source of compressed air connected with said hollow arm, substantially as specified.

2. In a can tester, the combination with a sealing head, of a movable puncture device mounted within said sealing head and a movable clamp for clamping the can against said sealing head, and a pressure gage communicating with the interior of the can through said sealing head and the opening in the wall thereof made by said puncture device substantially as specified.

3. In a can tester, the combination with a sealing head, of a movable puncture device mounted within said sealing head, a movable clamp for clamping the can against said sealing head, a pressure gage communicating with the interior of the can through said sealing head and the opening in its wall made by said puncture device, substantially as specified.

4. In a can tester, the combination with a sealing head, of a movable puncture device mounted within said sealing head, a movable clamp for clamping the can against said sealing head, a pressure gage communicating with the interior of the can through said sealing head and the opening in its wall made by said puncture device, and a source of compressed air communicating with the interior of the can through said sealing head and the opening made by said puncture device in the wall of the can, substantially as specified.

5. The combination with a hollow arm or coupling provided with a sealing head and a movable can-wall puncture device within the sealing head, said hollow arm or coupling having a passage communicating with a pressure gage, and a further passage communicating with a source of compressed air and a movable clamp for clamping the can against said sealing head, substantially as specified.

6. A can clamping yoke having two rigid arms one provided with a movable can clamp, and means for operating said clamp and the other a hollow arm provided with a sealing head and a movable puncture device within the sealing head, substantially as specified.

7. A can clamping yoke having one arm provided with a movable can clamp, and a hollow arm provided with a sealing head and a movable puncture device within the sealing head, of a pressure gage communicating with the interior of the can through said sealing head and the opening made in the can wall by said puncture device, substantially as specified.

8. A can clamping yoke having one arm provided with a movable can clamp, and a hollow arm provided with a sealing head and a movable puncture device within the sealing head, of a pressure gage communicating with the interior of the can through said sealing head and the opening made in the can wall by said puncture device, and an air pump communicating with the interior of the can through said sealing head and said opening made in the wall of the can by said puncture device, substantially as specified.

9. A can clamping yoke having two rigid arms, one provided with a movable can clamp, and means for operating said clamp and the other a hollow arm provided with a sealing head and a movable puncture device within the sealing head, and a spring for withdrawing said puncture device, substantially as specified.

10. A can clamping yoke having two rigid arms, one provided with a movable can clamp, and means for operating said clamp and the other a hollow arm provided with a sealing head and a movable puncture device within the sealing head, and a spring for withdrawing said puncture device, said puncture device having an operating stem and a sealing gasket surrounding said stem, substantially as specified.

CHARLES WERNER.

Witnesses:
Jno. M. Young,
F. B. Harwood.